United States Patent
Ishima et al.

(10) Patent No.: US 8,274,755 B2
(45) Date of Patent: Sep. 25, 2012

(54) MAGNETIC DISK UNIT

(75) Inventors: Yuuji Ishima, Kanagawa (JP);
Kazuyoshi Hanada, Kanagawa (JP);
Masaru Muranishi, Kanagawa (JP);
Takashi Matsuki, Kanagawa-ken (JP)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 852 days.

(21) Appl. No.: 11/879,953

(22) Filed: Jul. 18, 2007

(65) Prior Publication Data

US 2008/0024930 A1 Jan. 31, 2008

(30) Foreign Application Priority Data

Jul. 18, 2006 (JP) .................... 2006-195658

(51) Int. Cl.
*G11B 33/08* (2006.01)
*G11B 33/14* (2006.01)
*H05K 7/20* (2006.01)

(52) U.S. Cl. ............ 360/97.14; 360/97.16; 369/75.11; 361/679.33

(58) Field of Classification Search ........... 360/97.02, 360/97.14, 97.16–97.18; 361/679.33–679.39; 369/31.01, 30.63, 75.11, 75.1
See application file for complete search history.

(56) References Cited

U.S. PATENT DOCUMENTS

| | | | | |
|---|---|---|---|---|
| 4,979,062 A * | 12/1990 | Stefansky et al. | ......... | 360/97.02 |
| 5,029,027 A * | 7/1991 | Sleger | ....... | 360/97.03 |
| 5,081,552 A * | 1/1992 | Glaser et al. | ........ | 360/98.01 |
| 5,216,662 A * | 6/1993 | Stefansky et al. | ......... | 720/673 |
| 5,235,482 A * | 8/1993 | Schmitz | ..... | 360/97.02 |
| 5,243,495 A * | 9/1993 | Read et al. | ..... | 361/679.31 |
| 5,414,574 A | 5/1995 | Boutaghou et al. | | |
| 5,491,608 A * | 2/1996 | Koyanagi et al. | ........ | 361/679.34 |
| 5,587,855 A * | 12/1996 | Kim | ........... | 360/97.02 |
| 5,642,344 A * | 6/1997 | Yamada et al. | ........... | 720/640 |
| 6,137,658 A | 10/2000 | Matsuzaki et al. | | |
| 7,405,928 B2 * | 7/2008 | Robertson et al. | ...... | 361/679.33 |
| 2002/0036866 A1 * | 3/2002 | Ishii et al. | ........ | 360/256.1 |
| 2005/0195523 A1 * | 9/2005 | Abe et al. | ......... | 360/97.02 |
| 2006/0291093 A1 * | 12/2006 | Xu et al. | ........ | 360/97.01 |

FOREIGN PATENT DOCUMENTS

| | | |
|---|---|---|
| JP | 2002-163885 | 6/2002 |
| JP | 2003-208772 | 7/2003 |
| JP | 2004-005783 | 1/2004 |

* cited by examiner

*Primary Examiner* — Daniell L Negron
*Assistant Examiner* — Adam B Dravininkas (57) ABSTRACT

Embodiments of the present invention provide a magnetic disk unit capable of attaining miniaturization, lower cost, lighter weight, lower profile, and higher density. According to one embodiment, only a carriage and a spindle motor among respective constituent components of a hard disk drive (HDD) are securely attached to a support plate made of a hard metal material higher in rigidity than a shroud. All the constituent components of the HDD, except the carriage, and the spindle motor, (a voice coil motor, a ramp, a latch lever, an HDD connector and so forth), that is, the respective constituent components of the HDD, of which assembling precision, rigidity, and so forth are not required, are attached to the shroud small in wall-thickness, and lighter in weight, formed of a resin material such as plastics and so forth.

5 Claims, 14 Drawing Sheets

MAGNETIC DISK UNIT

CROSS-REFERENCE TO RELATED APPLICATION

The instant nonprovisional patent application claims priority to Japanese Patent Application No. 2006-195658 filed Jul. 18, 2006 and incorporated by reference in its entirety herein for all purposes.

BACKGROUND OF THE INVENTION

As described in, for example, Japanese Patent Publication No. 2004-005783 ("Patent Document 1"), a sealed structure of a conventional magnetic disk unit has been a structure built by mounting various components on a base plate fabricated by metal die casting, press working, and so forth, and securing a cover fabricated by metal die casting, press working, and so forth to the base plate with screws or the like through the intermediary of packing.

Incidentally, as a magnetic disk unit has since come to be mounted in a portable terminal, and so forth, further miniaturization, lower cost, lighter weight, lower profile, higher density, and so forth are now required of the magnetic disk unit.

However, with a fabrication method relying on the conventional technology described above, since the base plate and the cover of the magnetic disk unit are formed of a metal material, there is a problem that material cost increases. Further, since the base plate and the cover are formed of the metal material, there is also a problem that specific gravity of the magnetic disk unit becomes higher, causing a weight of the magnetic disk unit to become greater.

Further, when the base plate and the cover are formed by die casting, unless respective parts are designed so as to enable molten metal to flow therethrough, shrinkage cavities can locally occur at certain times. Accordingly, configuration in wall-thickness of the cover as well as the base plate, and layout of respective gates thereof need to be taken into consideration, however, because it is difficult under such constraints to extensively provide portions of those parts, extremely small in thickness, on the order of not more than 0.3 mm, it is not possible to reduce the wall-thickness any further, so that there arises a problem that it is difficult to attain the lower profile of the magnetic disk unit.

Then, when the base plate and the cover are formed by press working, those parts are formed by drawing of one and the same sheet material, so that fabrication is carried out under a constraint that all the parts have to be designed to have an identical wall-thickness. In consequence, if a wall-thickness (plate thickness) is small, it is not possible to obtain sufficient rigidity between respective fixed parts of the unit, for example, between a spindle motor and a voice coil motor for driving a carriage, so that if vibration, impact, and so forth are applied from outside when data is written to, or read from a magnetic disk, this will cause a problem that an operation to write or read the data cannot accurately be executed. On the contrary, if the wall-thickness is large, this will raise a problem of such a large wall-thickness interfering with further miniaturization, lower cost, lighter weight, lower profile, and higher density.

BRIEF SUMMARY OF THE INVENTION

Embodiments according to the present invention provide a magnetic disk unit capable of attaining miniaturization, lower cost, lighter weight, lower profile, and higher density.

Figure 2:
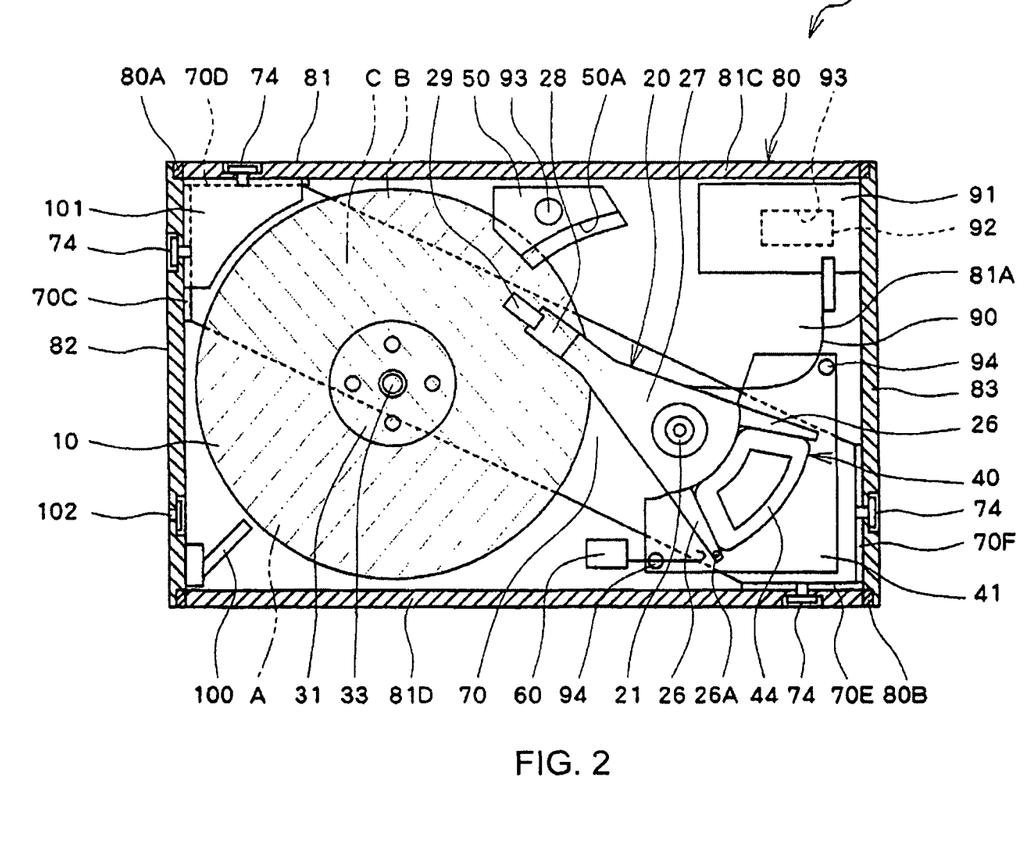
FIG. 2 is a sectional plan view of the HDD, as seen along line II-II in FIG. 1.

According to the particular embodiment disclosed in FIG. 2, only a carriage 20, and a spindle motor 30 among respective constituent components of HDD 1 are securely attached to a support plate 70 made of a hard metal material higher in rigidity than a shroud 80. All the constituent components of HDD 1, except the carriage 20, and the spindle motor 30, (a voice coil motor 40, a ramp 50, a latch lever 60, an HDD connector 92 and so forth), that is, the respective constituent components of HDD 1, of which assembling precision, rigidity, and so forth are not required, are attached to the shroud 80 small in wall-thickness, and lighter in weight, formed of a resin material such as plastics and so forth.

BRIEF DESCRIPTION OF THE DRAWINGS

FIG. 1 is seen.

DETAILED DESCRIPTION OF THE INVENTION

Embodiments in accordance with the present invention relate to a magnetic disk unit such as, for example, a hard disk drive, and so forth.

In view of the problems described above, embodiments according to the present invention have been developed, and it is therefore an object of embodiments according to the present invention to provide a magnetic disk unit capable of attaining miniaturization, lower cost, lighter weight, lower profile, and higher density.

Now, in order to resolve the problems with the conventional technology, embodiments of the present invention provide in one aspect a magnetic disk unit comprising a carriage provided with a head for writing data to, and reading data from a surface of each of magnetic disks, a spindle motor for driving the respective magnetic disks in rotation, a voice coil motor for driving the carriage in rotation in order to cause the head to be reciprocatively shifted over the surface of each of the magnetic disks, a ramp for holding the head when the head is retreated from the surface of each of the magnetic disks, and a latch for securing the carriage in order to prevent the head from being shifted over the surface of each of the magnetic disks when the head is retreated from the surface of each of the magnetic disks; wherein at least the carriage, and the spindle motor are supported by, and attached to a support plate made of the same metal material that the carriage, and the spindle motor are made of, and the support plate is formed so as to partially overlap the magnetic disk 10, as seen along a direction of the rotation axis of the magnetic disk.

A first embodiment of a magnetic disk unit according to the invention is described hereinafter with reference to FIGS. 1 to 5.

Figure 1:
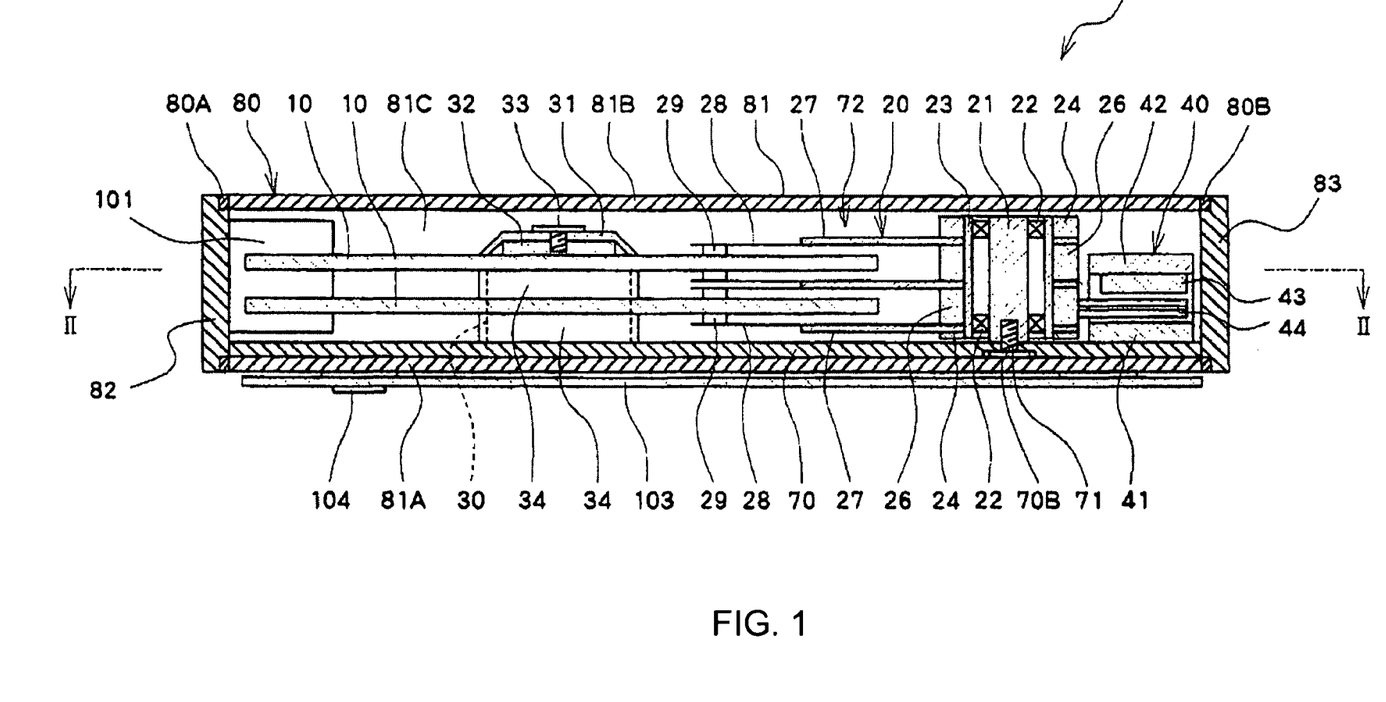
FIG. 1 is a sectional view of an HDD according to a first embodiment of the invention.

The magnetic disk unit 1 (hereinafter referred to also as HDD 1) according to the present embodiment is, for example, a hard disk drive comprising magnetic disks 10, a carriage 20, a spindle motor 30, a voice coil motor 40, a ramp 50, a latch lever 60, a support plate 70, and a shroud 80.

The magnetic disks 10 are formed in the shape of, for example, two circular sheets small in thickness. And, the magnetic disks 10 each have a magnetic film for storing information, formed over a surface of the circular sheet made of glass or aluminum.

Figure 4:
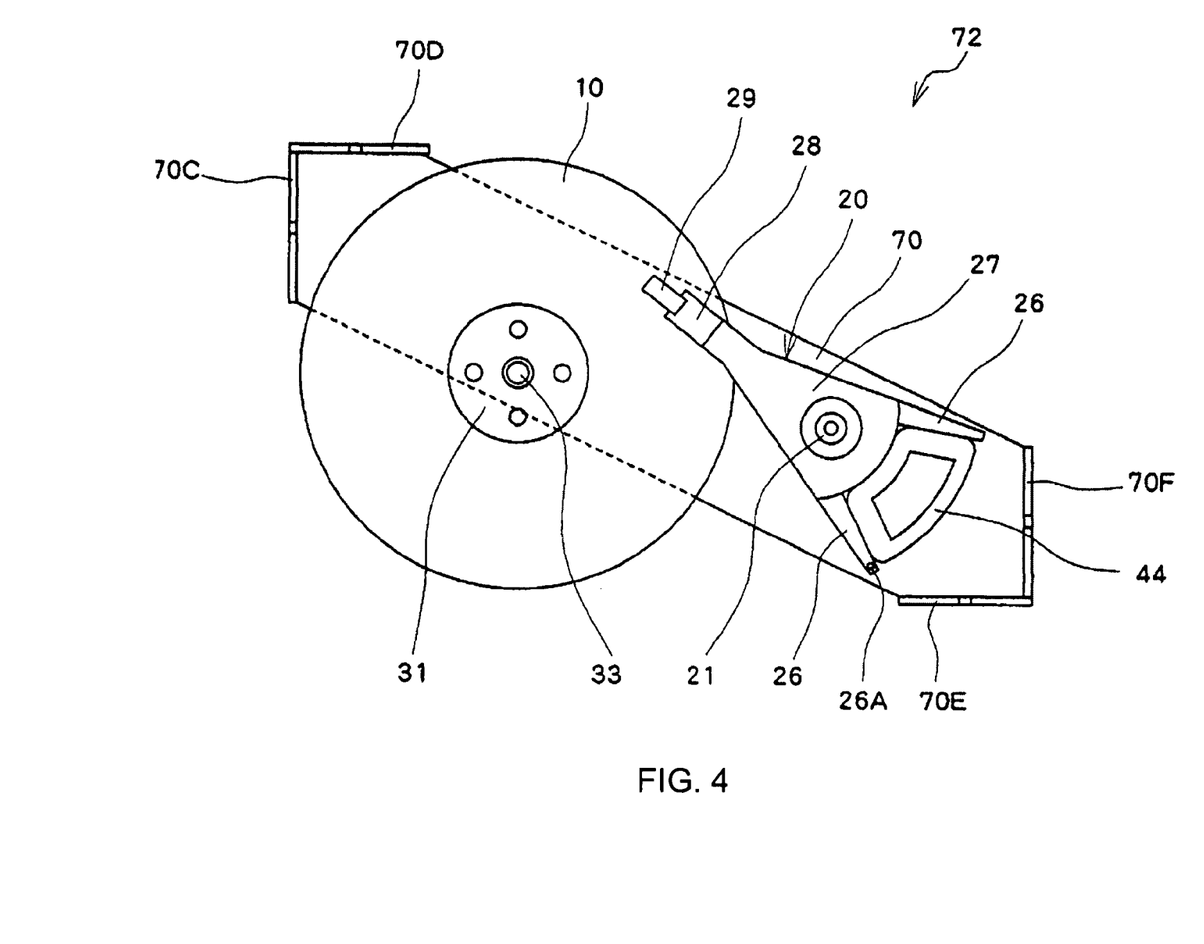
FIG. 4 is a plan view showing an assembly in FIG. 2.

As shown in FIGS. 1 and 4, the spindle motor 30 is fixedly attached to the support plate 70. The two sheets of the magnetic disks 10 are fixed to the spindle motor 30. A disk spacer 34 made of steel, stainless steel, or aluminum is provided between the respective magnetic disks 10 in such a way as to be interposed therebetween, thereby maintaining an interval between the respective magnetic disks 10 with high precision. Further, with the spindle motor 30, a screw 33 is inserted into a motor hub (not shown) thereof, made of stainless steel, aluminum or steel, through the intermediary of a clamp 31, and a presser plate 32, made of stainless steel, aluminum or steel, thereby securing the respective magnetic disks 10 to the spindle motor 30 with high precision. By so doing, the respective magnetic disks 10 can be driven in rotation by the spindle motor 30 with high precision.

As shown in FIGS. 1 and 2, the carriage 20 comprises a fixed axle 21 fixedly attached to the support plate 70, a rotating cylinder 23 rotatably provided on the outer peripheral side of the fixed axle 21 through the intermediary of pivot bearings 22, 22, respectively, head arms 27 alternately spaced with the magnetic disks 10, having respective base ends thereof, fixed to the outer periphery of the rotating cylinder 23 through the intermediary of coil spacers 26, 26, respectively, between pivot hubs 24, 25, a suspension 28 made of aluminum, magnesium, or stainless steel, having a base end thereof, fixedly attached to the extremity of the head arm 27, and a head 29 with a base end fixed to the extremity of the suspension 28, and floated above the surface of the magnetic disks 10 so as to be several nm away therefrom, for writing information to, and/or reading information from the surface of each of the magnetic disks 10.

The respective coil spacers 26 are provided so as to be extended from the respective head arms 27 within the carriage 20 toward directions opposite to the respective head arms 27 with an interval provided therebetween. Further, the coil spacer 26 is provided between the respective head arms 27 so as to be interjacent therebetween, having a function of keeping an interval between the respective head arms 27 with high precision.

Furthermore, one side of an FPC (Flexible Printed Circuit Board) 90 is attached to the respective head arms 27 by bonding, caulking, fitting, and so forth. Then, the other side of FPC 90 is connected to a read/write printed circuit board 91 with a read/write amplifier (not shown) for controlling an electric signal from the head 29, mounted thereon. A HDD connector 92 is attached to the read/write printed circuit board 91 via a pin (not shown) made of steel, stainless steel, or brass. By so doing, the electric signal from the head 29 is outputted to the outside of the HDD 1 via the read/write printed circuit board 91, and the HDD connector 92.

Further, a power supply of a coil 44 (to be described later in the present description) is also connected to the HDD connector 92. The read/write printed circuit board 91 is fixedly attached to the shroud 80 with screws or by bonding. Positioning of the read/write printed circuit board 91 in relation to the shroud 80 is implemented by inserting the HDD connector 92 into a HDD connector hole 93 provided on the shroud side of the read/write printed circuit board 91.

The carriage 20 is rotated around the fixed axle 21, and is designed in good balance such that no fluctuation occurs to a rotational speed of the carriage 20 regardless of an angle at which the HDD 1 is placed, and the carriage 20 does not move even if an impact from outside is applied thereto.

The voice coil motor 40 is for driving the respective head arms 27 in rotation. The voice coil motor 40 comprises a lower yoke 41 formed of stainless steel or aluminum, an upper yoke 42 similarly formed of stainless steel or aluminum, and a permanent magnet 43 bonded to either, or both of the lower yoke 41 and the upper yoke 42.

The coil 44 formed of a lead wire wound in a series of rings is disposed between the lower yoke 41 and the permanent magnet 43. The coil 44 is secured between the coil spacers 26, 26 with the use of nuts (not shown) made of steel, stainless steel or aluminum.

Further, in order to prevent the magnetic disk 10 from interfering with the head 29 due to an impact from outside, and so forth, the HDD 1 keeps the head 29 retreated from the surface of the magnetic disk 10 except at a time when an operation whereby information is written to, or read from the magnetic disk 10 by the head 29 is required. At this point in time, the extremity of the suspension 28 is inserted into a sloped groove 50A formed in the ramp 50 made of plastics, fixed to a bottom 81A of the shroud 80 (to be described later in the present description), with a screw 93, by bonding, and so forth, so as to be slid, thereby avoiding interference between the respective heads 29.

Further, at this point in time, the carriage 20 is secured by causing a hook-like part 26A of the coil spacer 26, made of plastics, aluminum, magnesium, steel, or stainless steel, to be caught on the latch lever 60 made of plastics, aluminum, steel or stainless steel so as to prevent the head 29 from becoming dislodged. The latch lever 60 is fixed to the bottom 81A of the shroud 80 (to be described later in the present description) with a screw, by bonding, and so forth.

Figure 5:
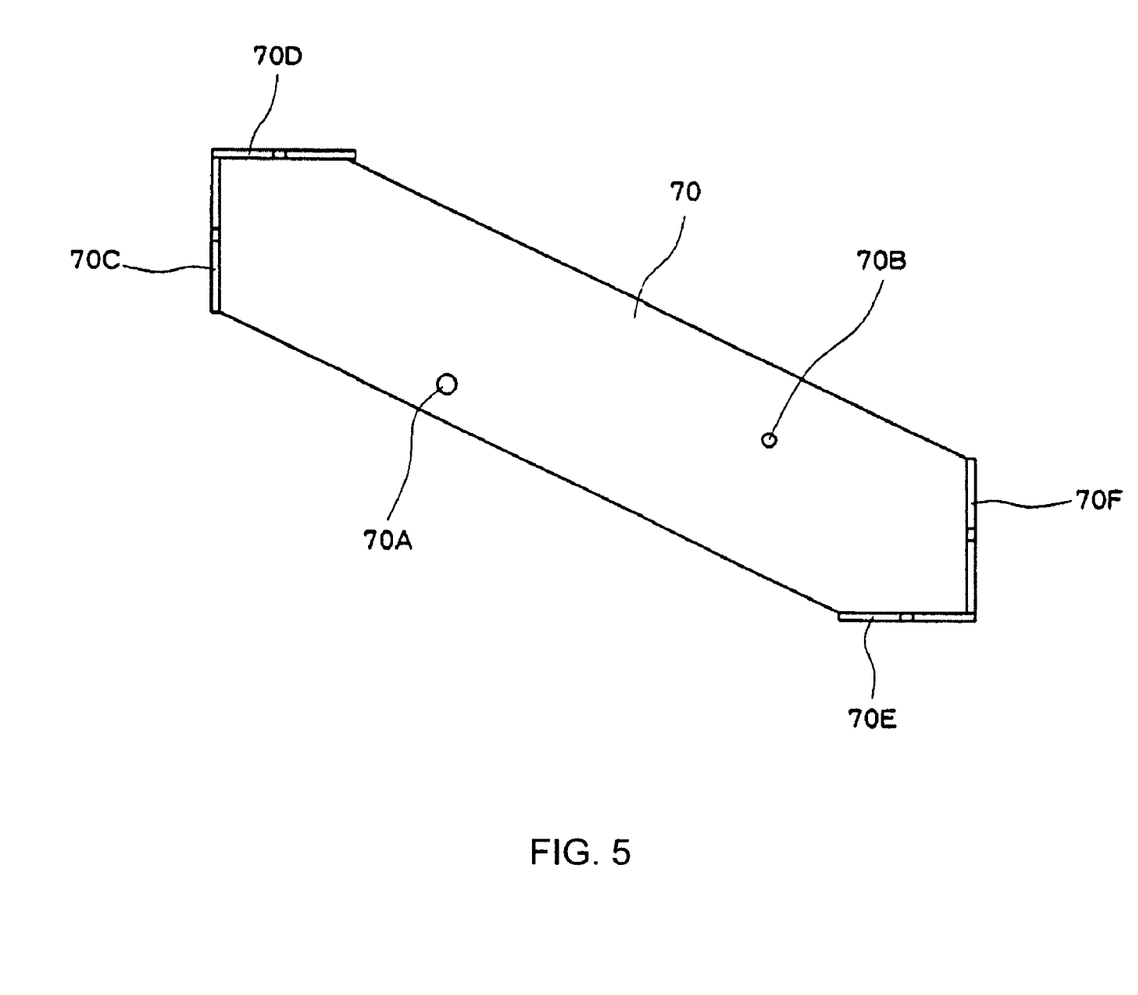
FIG. 5 is a plan view showing a support plate only in FIG. 4.
Figure 6:
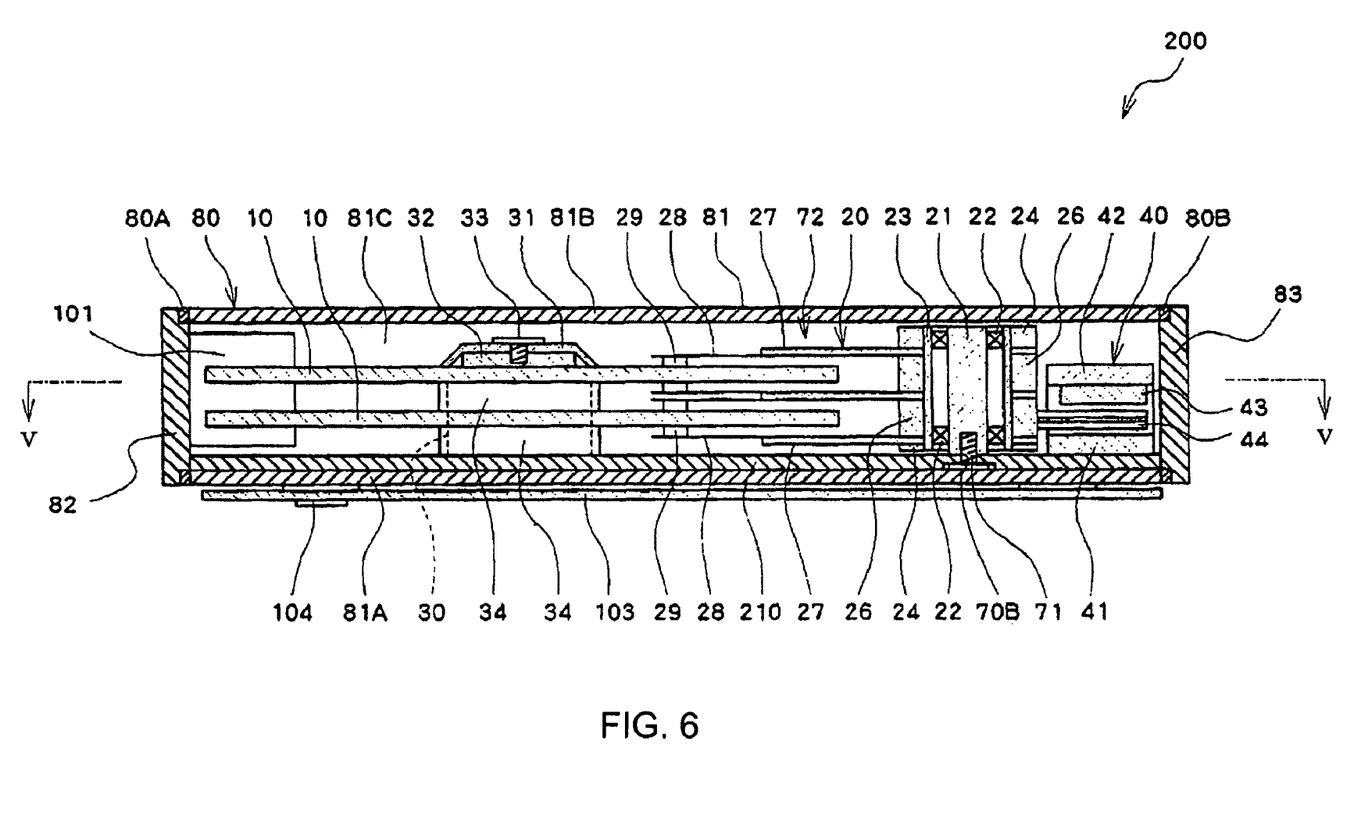
FIG. 6 is a sectional view of a HDD according to a second embodiment of the invention.

As shown in FIG. 5, the support plate 70 is formed as a plate substantially rectangular in shape, formed by applying press working, and so forth to a metal material relatively high in rigidity, such as aluminum, steel, stainless steel, brass, or the like. Further, the support plate 70 is provided with a spindle motor attachment hole 70A and a carriage attachment hole 70B. In addition, stoppers 70C, 70D, each bent upward toward an upper part 81B side of the shroud 80, in a shape substantially resembling the letter L, are provided at one end of the support plate 70, in the longitudinal direction thereof, while stoppers 70E, 70F, each bent upward toward the upper part 81B side of the shroud 80, in a shape substantially resembling the letter L, are similarly provided at the other end of the support plate 70, in the longitudinal direction thereof.

Further, the support plate 70 is placed over the bottom 81A of the shroud 80, and with the support plate 70 kept in that state, by butting stoppers 70C, 70D, 70E, and 70F against a magnetic disk side lid 82 of the shroud 80, a side part 81C of the shroud 80, a side part 81D of the shroud 80, and a carriage side lid 83 of the shroud 80, respectively, positioning of the support plate 70, in relation to the shroud 80, is implemented.

And, the stoppers 70C, 70D, 70E, and 70F of the support plate 70 are fixedly attached to the magnetic disk side lid 82 of the shroud 80, the side part 81C of the shroud 80, the side part 81D of the shroud 80, and the carriage side lid 83 of the shroud 80, respectively, with the use of each of four pieces of screws 74.

Then, the spindle motor 30 is fixedly attached to the support plate 70 by inserting a screw (not shown) into the spindle motor attachment hole 70A while the fixed axle 21 of the carriage 20 is fixedly attached to the support plate 70 by inserting a screw 71 into the carriage attachment hole 70B. The support plate 70, together with the spindle motor 30 and the carriage 20, makes up a HDD assembly 72.

Now, as shown in FIG. 2, the support plate 70 is formed so as to partially overlap the magnetic disk 10, as seen along a direction of the rotation axis of the magnetic disk 10, that is, a direction of the rotation axis of the spindle motor 30 (an axial direction of the screw 33). More specifically, the magnetic disk 10 has non-opposing parts A, B that are not opposed to (faced with) the support plate 70, in the direction of the rotation axis of the spindle motor 30, and an opposing part C that is opposed thereto (refer to dash and double-dotted lines in FIG. 2).

Figure 3:
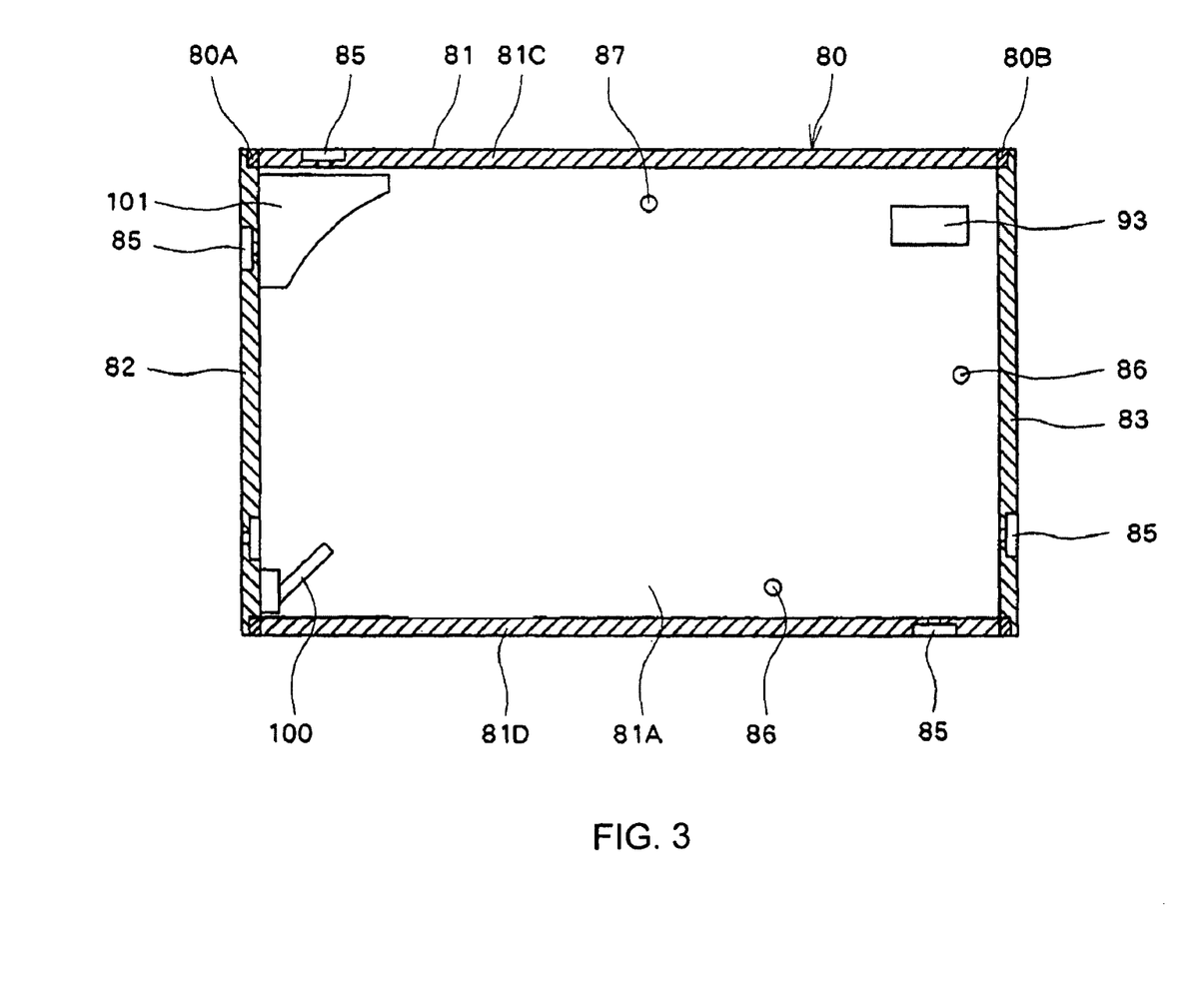
FIG. 3 is a sectional plan view showing a shroud, and so forth in FIG. 2.

As shown in FIGS. 1 and 3, the shroud 80 is formed of a resin material such as plastics and so forth, lower in rigidity than the support plate 70. Further, the shroud 80 comprises a cylindrical part 81 in the shape of a square cylinder, the magnetic disk side lid 82 of the shroud 80, blocking up an opening of the cylindrical part 81, on one end side thereof, through the intermediary of a packing 80A, and the carriage side lid 83 of the shroud 80, blocking up an opening of the cylindrical part 81, on the other end side thereof, through the intermediary of a packing 80B. Further, the cylindrical part 81 of the shroud 80 has the bottom 81A, the upper part 81B, and the side parts 81C, 81D.

The interior of the shroud 80 constitutes a sealed space air-tightly enclosed with the packing 80A, 80B, and the ingress of dust and so forth in-between the head 29 and the magnetic disk 10 can be blocked, thereby enabling an operation for writing and reading information to be smoothly carried out. Further, a circulatory filter 100 for catching dust floating in the sealed space is attached to the magnetic disk lid 82 of the shroud 80, so as to be secured thereto by bonding, by use of a screw, and so forth. In addition, activated charcoal 101 for absorbing corrosive gasses, and water vapor within the shroud 80, and a breathing filter 102 for blocking the ingress of dust into the shroud 80, due to breathing of external air, are attached to the magnetic disk side lid 82 of the shroud 80 by bonding, and so forth.

The magnetic disk side lid 82 of the shroud 80, the side part 81C of the shroud 80, the side part 81D of the shroud 80, and the carriage side lid 83 of the shroud 80 are each provided with a screw-insertion-hole 85 for attachment of the support plate 70 thereto, respectively, with the use of the screw 74. Further, the bottom 81A of the shroud 80 is provided with screw-insertion-holes 86, 86 for attachment of the lower yoke 41 of the voice coil motor thereto with the use of a screw 94, respectively, together with a screw-insertion-hole 87 for attachment of the ramp 50 thereto with the use of a screw 93. In addition, the bottom 81A is provided with a shroud-side HDD connector hole 93 that is a square hole.

The electric signal from the head 29, delivered into the HDD connector 92, and current fed to the coil 44 are transmitted to a main board 103 made up of a laminate of glass and epoxy resin, with a multitude of elements soldered thereto, for controlling the unit, via the HDD connector 92. Further, current for driving the spindle motor 30, and current for a latch coil (not shown) are similarly transmitted to the main board 103. The main board 103 is secured to the bottom 81A of the shroud 80 with the use of a screw 104, by bonding, and so forth.

Since there is the need for causing the head 29 to be floated above the surface of the magnetic disks 10 so as to be several nm away therefrom, as previously described, the highest assembling precision in relation to HDD 1 is required of the carriage 20 having the head 29, and the spindle motor 30 with the magnetic disks 10 fixedly attached thereto among the respective constituent components of HDD 1.

Accordingly, with embodiments of the present embodiment, there is adopted a makeup wherein only the carriage 20, and the spindle motor 30 among the respective constituent components of HDD 1 are securely attached to the support plate 70 made of a hard metal material higher in rigidity than the shroud 80, so that it is possible to maintain an interval between the head 29 and the respective magnetic disks 10 with high precision.

Accordingly, with the present embodiment, all the constituent components of HDD 1 (the voice coil motor 40, ramp 50, latch lever 60, HDD connector 92, and so forth), except the carriage 20, and the spindle motor 30, that is, the respective constituent components of HDD 1, of which assembling precision, rigidity, and so forth are not required, can be attached to the shroud 80 small in wall-thickness, and lighter in weight, formed of the resin material such as plastics or the like, so that HDD 1 can attain miniaturization, lower cost, lighter weight, lower profile, and higher density.

Next, FIGS. 6 to 12 each show a second embodiment of a magnetic disk unit according to the present invention. In the figures, constituent elements of the present embodiment, identical to those of the first embodiment, are denoted by like reference numerals, thereby omitting description thereof.

With the present embodiment as well, a carriage 20 and a spindle motor 30 are fixedly attached to a support plate 210 of HDD 200, as is the case with the first embodiment.

However, HDD 200 according to the present embodiment differs from HDD 1 of the first embodiment in that in addition to the carriage 20 and the spindle motor 30, a voice coil motor 40, a ramp 50, and a latch lever 60 are fixedly attached to the support plate 210.

Figure 8:
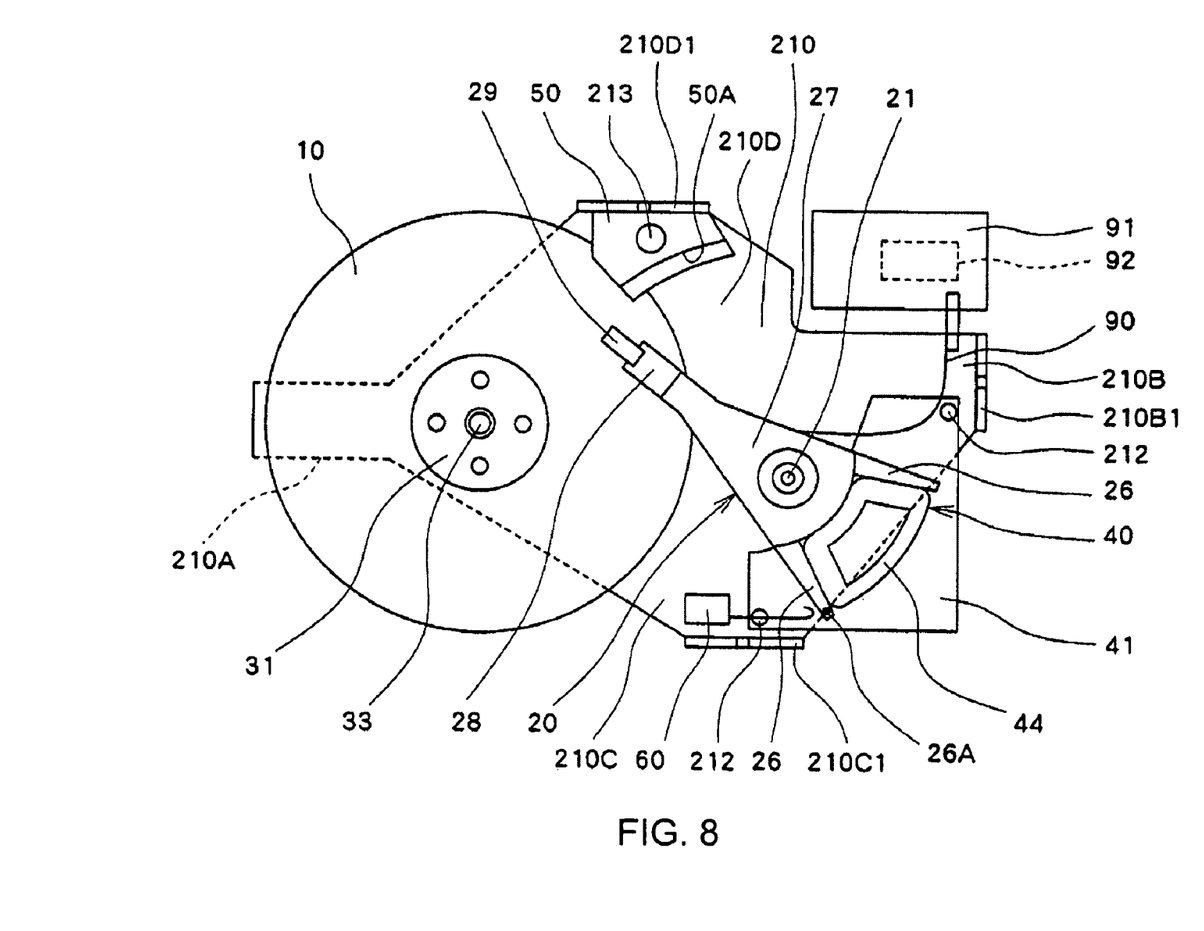
FIG. 8 is a plan view showing an assembly in FIG. 7.
Figure 9:
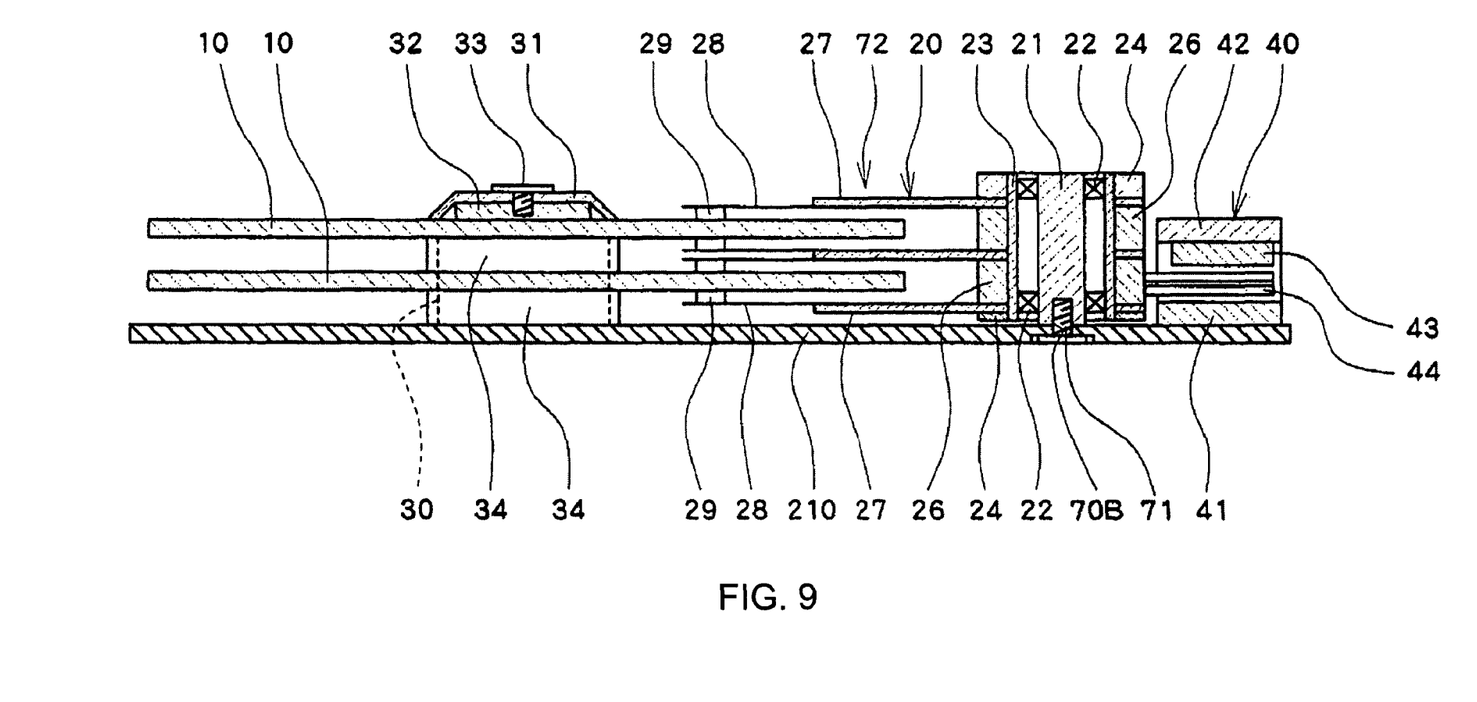
FIG. 9 is a sectional view showing an assembly in FIG. 6.
Figure 10:
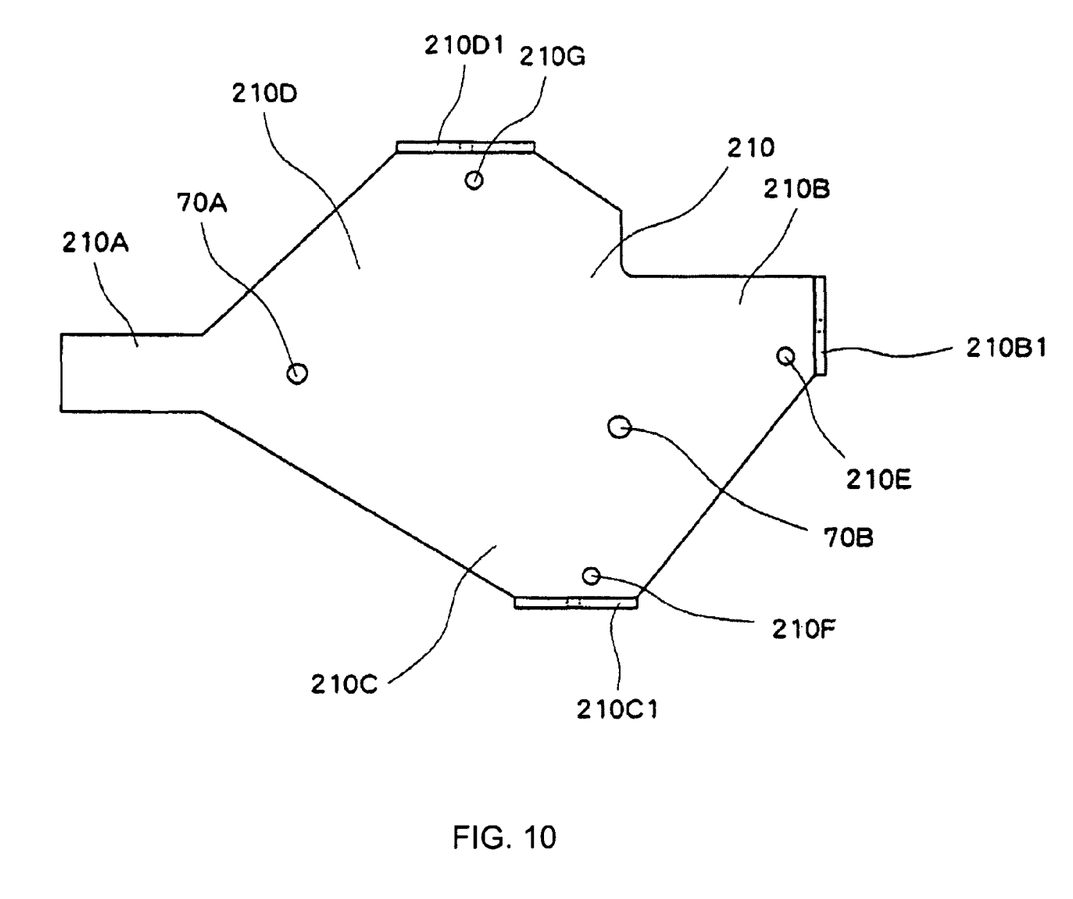
FIG. 10 is a plan view showing a support plate only in FIG. 7.
Figure 11:
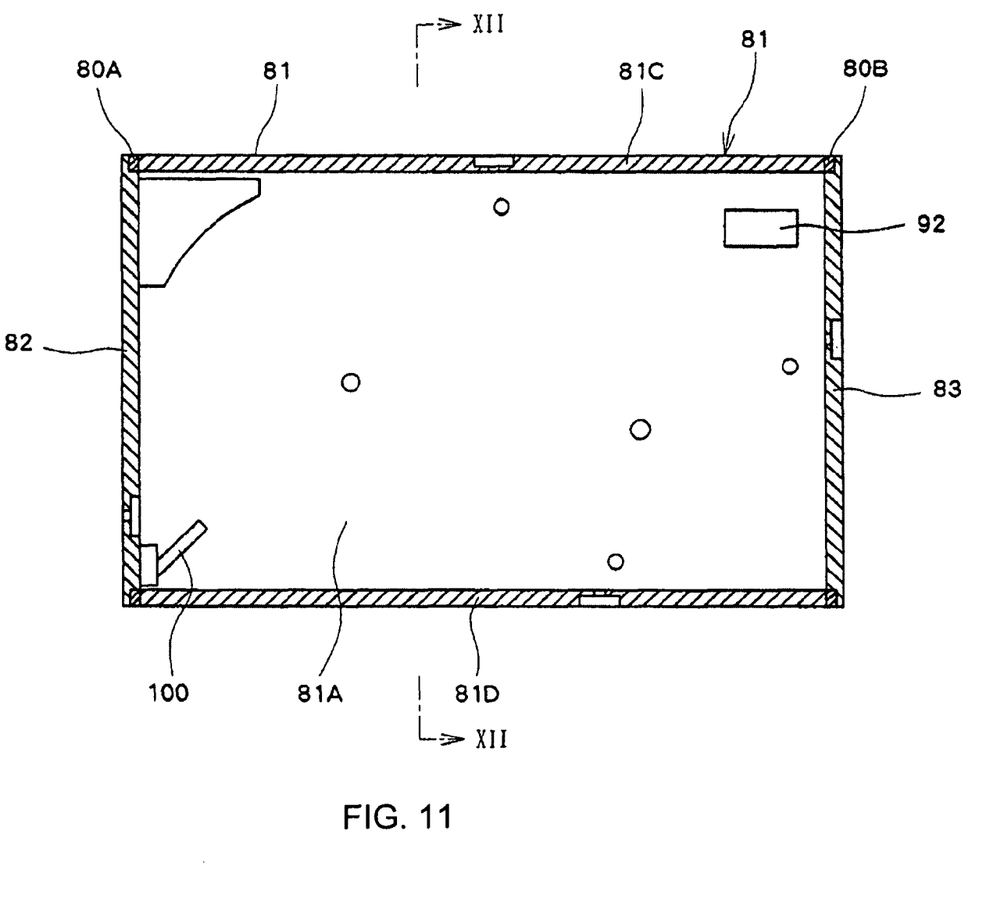
FIG. 11 is a sectional plan view showing a shroud, and so forth in FIG. 7.
Figure 12:
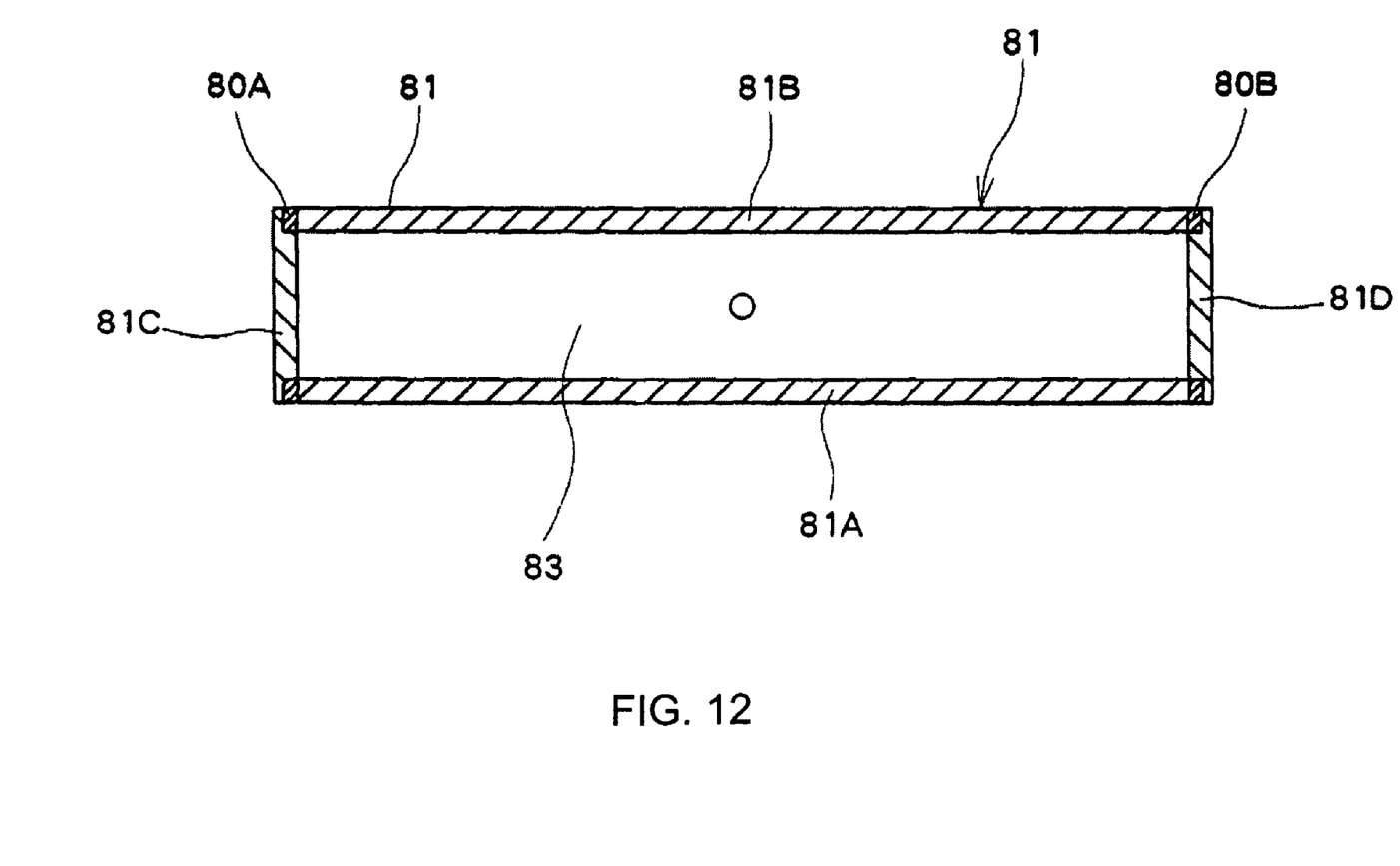
FIG. 12 is a sectional plan view of the shroud, as seen along line XII-XII in FIG. 11.
Figure 13:
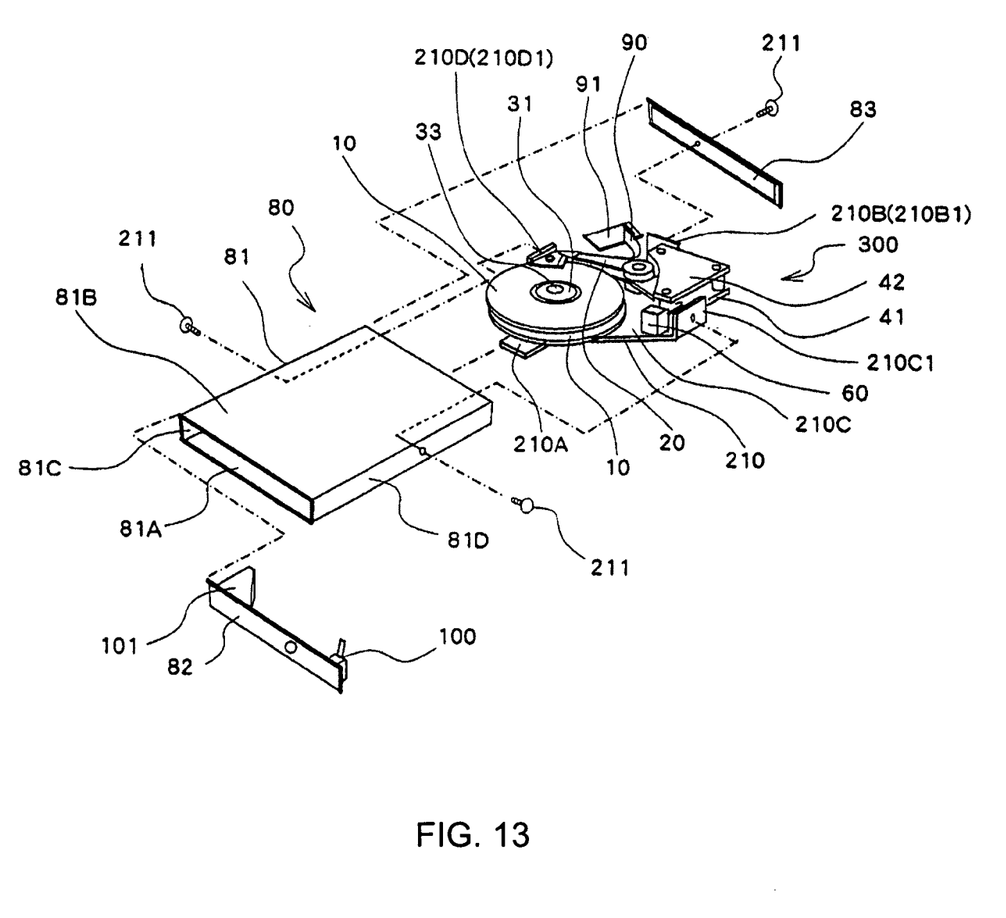
FIG. 13 is an assembly view of an HDD according to a second embodiment of the invention.

Now, as shown in FIGS. 8 and 10, the support plate 210 is formed as a plate square in shape, formed by applying press working, and so forth to a metal material relatively high in rigidity such as aluminum, steel, stainless steel, brass, or the like. Further, the support plate 210 comprises a magnetic disk side extension 210A extended toward a magnetic disk side lid 82 of the shroud 80, first and second motor-side extensions 210B, 210C extended toward the voice coil motor 40, and a ramp side extension 210D extended toward the ramp 50. The first and second motor-side extensions 210B, 210C are provided with stoppers 210B1, 210C1, respectively, the stoppers 210B1, 210C1 being positioned on the extremity sides of the first and second motor-side extensions 210B, 210C, respectively, and bent in a shape substantially resembling the letter L, while the ramp side extension 210D is provided with a stopper 210D1 positioned on the extremity side thereof, and bent in a shape substantially resembling the letter L.

Then, by butting the extremity of the magnetic disk side extension 210A, the stopper 210B1 of the first motor-side extension 210B, the stopper 210C1 of the second motor-side extension 210C, and the stopper 210D1 of the ramp side extension 210D against the magnetic disk side lid 82 of the shroud 80, a side part 81D of the shroud 80, a carriage side lid 83 of the shroud 80, and a side part 81C of the shroud 80, respectively, positioning of the support plate 210, in relation to the shroud 80, is implemented. Further, the stopper 210B1, the stopper 210C1, and the stopper 210D1 of the support plate 210 are secured to a carriage side lid 83 of the shroud 80, the side part 81D, and the side part 81C, respectively, with each of three pieces of screws 211.

Further, the support plate 210 differs from the support plate 70 according to the first embodiment in that the former is provided with yoke attachment holes 210E, 210F, and a ramp attachment hole 210G in addition to a spindle motor attachment hole 70A and a carriage attachment hole 70B.

A lower yoke 41 of the voice coil motor 40 is attached to the support plate 210 with the use of two pieces of screws 212, and the ramp 50 is attached to the support plate 210 with the use a screw 213. Further, a latch lever 60 is fixed to the support plate 210 with the use of a screw, or by bonding, and so forth. The support plate 210, together with the carriage 20, the spindle motor 30, the voice coil motor 40, the ramp 50, and the latch lever 60, make up a HDD assembly 300.

Figure 7:
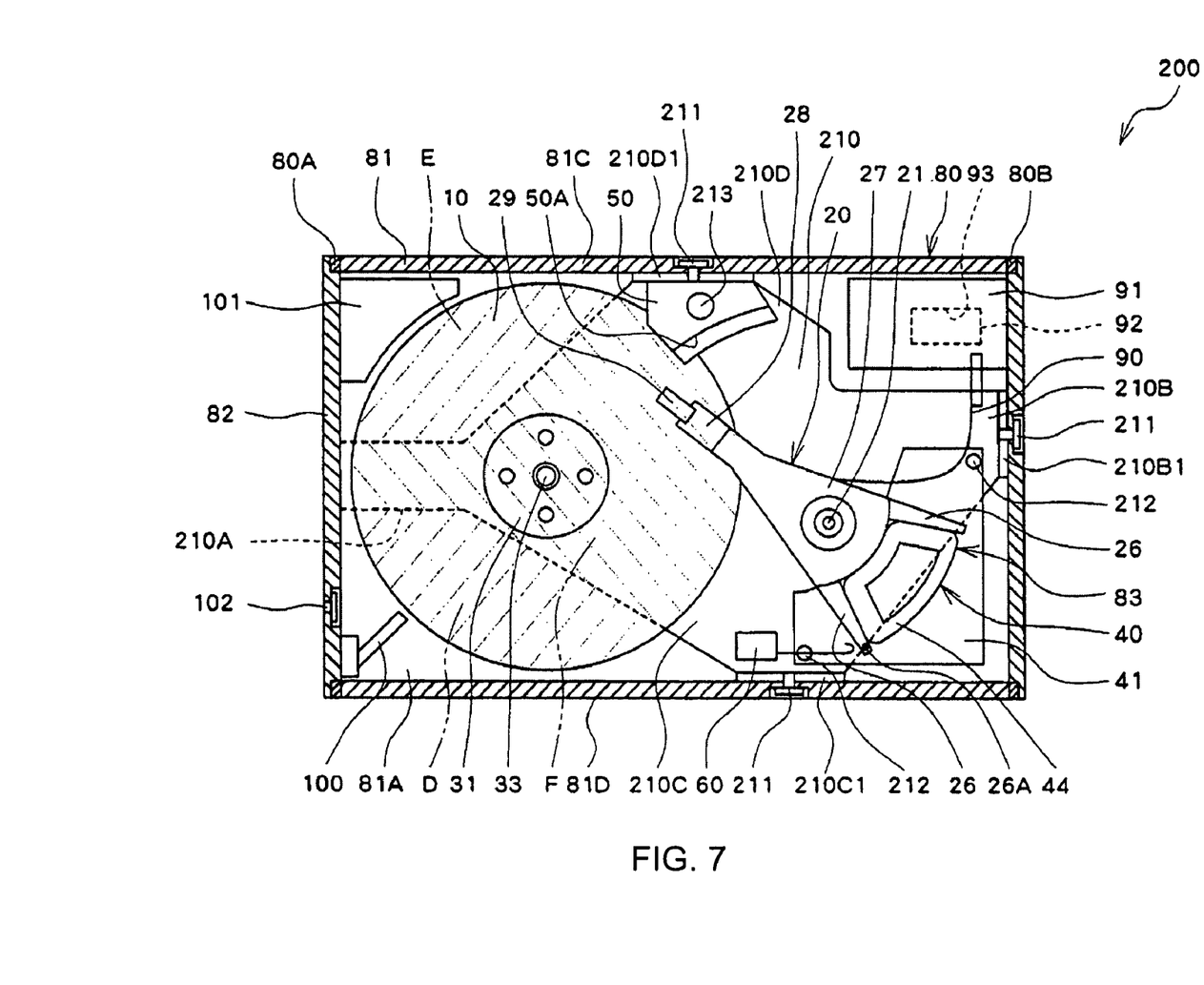
FIG. 7 is a sectional plan view of the HDD, as seen along line V-V in FIG. 6.

As shown in FIG. 7, the support plate 210 is formed so as to partially overlap the magnetic disk 10, as seen along a direction of the rotation axis of the magnetic disk 10, that is, a direction of the rotation axis of the spindle motor 30 (an axial direction of a screw 33), and the magnetic disk 10 has non-opposing parts D, E that are not opposed to (faced with) the support plate 210, along the direction of the rotation axis of the spindle motor 30, and an opposing part F that is opposed thereto (refer to dash and double-dotted lines in FIG. 7).

With the present embodiment having such a makeup as above-described, there is adopted a makeup wherein the carriage 20, the spindle motor 30, the voice coil motor 40, the ramp 50, and the latch lever 60 are supported by the support plate 210 made of a hard metal material higher in rigidity than the shroud 80 to be thereby fixedly attached thereto, so that it is possible to enhance assembling precision with respect to the carriage 20, the spindle motor 30, the voice coil motor 40, the ramp 50, and the latch lever 60, thereby obtaining substantially the same operational effects as those of the first embodiment.

Figure 14:
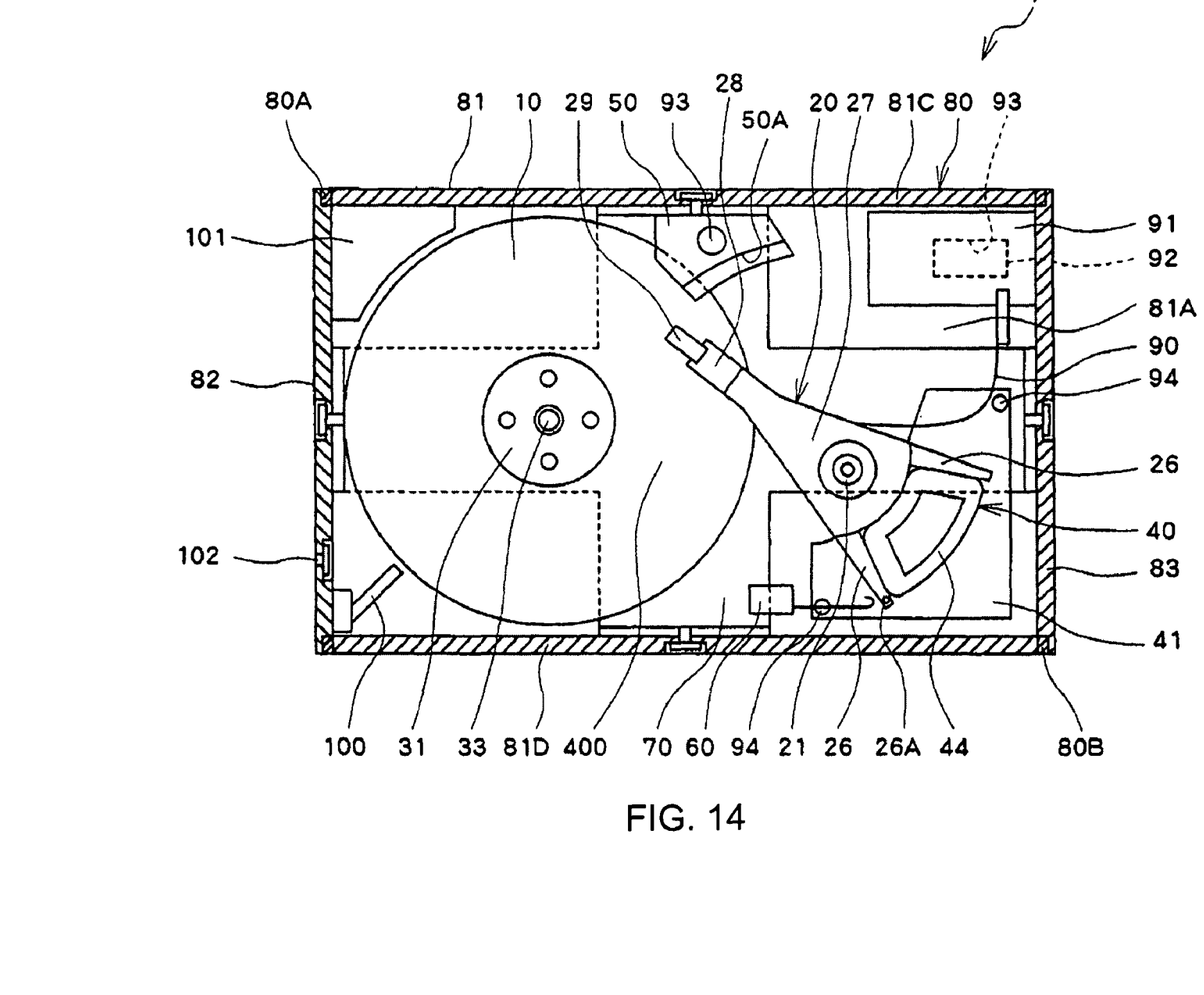
FIG. 14 is a sectional plan view of an HDD according to a variation of one embodiment of the invention, as seen from the same position where

Furthermore, with the first and second embodiments, the case of the support plate 70 (210) being formed in the square shape is described by way of example, however, the invention is not limited in scope thereto, and as shown in FIG. 14, a support plate 400 according to a variation of an embodiment of the invention may be formed in the shape of a cross.

What is claimed is:

1. A magnetic disk unit comprising:
   a carriage provided with a head for writing data to, and reading data from a surface of each of a plurality of magnetic disks;
   a spindle motor for driving the respective magnetic disks in rotation;
   a voice coil motor for driving the carriage in rotation in order to cause the head to be reciprocatively shifted over the surface of each of the magnetic disks;
   a ramp for holding the head when the head is retreated from the surface of each of the magnetic disks; and
   a latch for securing the carriage in order to prevent the head from being shifted over the surface of each of the magnetic disks when the head is retreated from the surface of each of the magnetic disks,
   a support plate formed in a substantially rectangle shape and having at least two parallel sides and made of the same metal material that the carriage, and the spindle motor are made, the support plate only partially overlapping the magnetic disk, as seen along a direction of the rotation axis of the magnetic disk, wherein
   a whole assembly made up of the carriage, the spindle motor, the voice coil motor, the ramp, and the latch are mounted on the support plate; and
   a shroud enclosure comprising:
      a single piece top and bottom portion;
      and two end cap portions; said shroud enclosure providing a sealed space air-tight enclosure into which said whole assembly mounted on the support plate is inserted to form an operational hard disk drive.

2. A magnetic disk unit according to claim 1, wherein said shroud is lower in rigidity than the support plate.

3. A magnetic disk unit according to claim 1, wherein at least one end cap portion of the shroud includes a filter selected from the group of filters consisting of:—a circulatory filter, and an activated charcoal filter.

4. A magnetic disk unit according to claim 1, wherein the single piece top and bottom portion and the end cap portions of the shroud each are integrally formed of plastics.

5. A magnetic disk unit according to claim 1, wherein the single piece top and bottom portion and the end cap portions of the shroud each are formed of the same kind of material.

* * * * *